United States Patent [19]

Starczewski et al.

[11] Patent Number: 4,767,651

[45] Date of Patent: Aug. 30, 1988

[54] MULTIPLE LAYER FILM AND CONTAINERS MADE THEREFROM

[75] Inventors: John F. Starczewski, Appleton; Joseph C. Hsu, Neenah; Robert J. Blemberg, Appleton; Kevin J. Curie; Jerry F. Jesse, both of Neenah, all of Wis.

[73] Assignee: American National Can Company, Chicago, Ill.

[21] Appl. No.: 77,830

[22] Filed: Jul. 27, 1987

Related U.S. Application Data

[63] Continuation-in-part of Ser. No. 830,412, Feb. 18, 1986, Pat. No. 4,687,688.

[51] Int. Cl.$^4$ .................... B65D 65/40; B32B 27/32; B65B 31/00
[52] U.S. Cl. .................... 428/35; 428/476.1; 53/433; 53/434; 53/440; 264/171; 264/211.13
[58] Field of Search .................... 428/35, 476.1, 516; 264/171, 211.13; 53/433, 434, 440, 140, 510, 511, 512

[56] References Cited

U.S. PATENT DOCUMENTS

| | | | |
|---|---|---|---|
| 3,697,368 | 10/1972 | Bhura et al. | 428/476.1 |
| 3,912,843 | 10/1975 | Brazier | 428/475.8 |
| 3,988,499 | 10/1976 | Reynolds | 428/475.8 |
| 3,997,383 | 12/1976 | Bieler et al. | 428/476.1 |
| 4,405,667 | 9/1983 | Christensen et al. | 428/476.1 |
| 4,501,798 | 2/1985 | Koschak et al. | 428/476.1 |
| 4,612,221 | 9/1986 | Biel et al. | 428/476.1 |
| 4,687,688 | 8/1987 | Curie et al. | 428/476.1 |

FOREIGN PATENT DOCUMENTS 9212261 12/1984 Japan .................... 428/476.1

Primary Examiner—John E. Kittle
Assistant Examiner—James J. Seidleck
Attorney, Agent, or Firm—Paul R. Audet; Thomas D. Wilhelm

[57] ABSTRACT

Multiple layer films and containers. The films have a first layer of either nylon 6,6 or a combination of nylon 6,6 with nylon 6 wherein the melting point temperature of the combination is greater than the melting point temperature of the corresponding nylon 6. A second layer is comprised of linear low density polyethylene, and 0% to 40% low density polyethylene. A third adhesive layer is disposed between the first and second layers. The containers are susceptible of being sealed with included gas at low pressure, and subsequently boiled in water without rupture of the seals. The film is preferably coextruded from tubular die, thereby setting forth a new method for forming a mulitple layer film comprising a combination of linear low density polyethylene, optionally with up to 40% low density polyethylene, and nylon 6,6, optionally combined with nylon 6 in a composition having a melting point temperature greater than that of the corresponding nylon 6.

23 Claims, 3 Drawing Sheets

MULTIPLE LAYER FILM AND CONTAINERS MADE THEREFROM

This is a continuation-in-part application of application Ser. No. 830,412, filed Feb. 18, 1986 now U.S. Pat. No. 4,687,688, and herein incorporated by reference.

BACKGROUND OF THE INVENTION

This invention pertains to multiple layer packaging materials and containers made with those packaging materials. The containers are typically made by heat sealing facing portions of films to each other about a common periphery to form an enclosure, but leaving one side of the enclosure open. A product is then inserted into the container and the open side of the container is sealed closed. The closure of this last side completes the closure of the container.

Alternately, a package may be made from, for example, a receptacle made by thermoforming a sheet, with a non-formed film used as a lid closure over the receptacle.

For use with some products, it is desired that the packaged product be capable of being boiled, as in boiling water, after the package is sealed closed with the product in it. It is this particular market and problem that the invention addresses.

There are available, to the market, certain sheet structures which are capable of handling boiling temperatures. These include, for example, structures which are made for retort pouch applications. These structures are typically of the order of 6 to 8 mils thick, and may contain a metal foil. Another family of structures, of approximately the same thickness includes an outer layer of nylon, a second layer of ethylene vinyl alcohol, a third layer of nylon, a fourth layer of adhesive and a fifth layer of a sealant material.

While the above structures may be useful as regards retort pouch applications, they are prohibitively expensive for use with less valuable products. To the present time, it is not seen that there is available a film for making boilable containers, such as bags, at an economical cost, which containers may thus be used for lower priced products.

It is an object of this invention to provide a novel and economical film which can be made into a boilable container and wherein the contents of the container may expand significantly at boiling temperature; the container being capable of withstanding the boiling process without rupture.

It is a particular object of the invention to provide a packaging container which can be sealed with a moderate amount of gas in it and subsequently boiled without rupture of the package.

It is yet another object of the invention to provide a method of packaging a product in a container where it is acceptable to include an amount of air in the container and where the air does not cause rupture of the container on subsequent boiling of the container.

SUMMARY OF THE INVENTION

Certain of these objectives are obtained in a polymeric film, wherein the first layer of the film is a nylon selected from the group consisting of nylon 6,6 and combinations of nylon 6,6 with nylon 6 wherein the combinations have melting point temperatures greater than the melting point temperature of the corresponding nylon 6. The second layer is linear low density polyethylene (LLDPE) and optionally up to 50% by weight low density polyethylene, in blend composition. A third layer of an adhesive polymer is disposed between the first and second layers and adheres them to each other. The composition of the third layer preferably has a substantial fraction of linear low density polyethylene in its base resin. The base resin may consist entirely of linear low density polyethylene.

Preferably the film is made by the process of coextrusion of the three layers to form a three layer structure, followed by liquid quenching of the three layer structure.

Additional objectives of the invention are achieved in containers made from the films, and particularly containers which are capable of being boiled in water for at least about 10 minutes, preferably 30 minutes.

Preferably the functional characteristics of the container are such that when product is inserted into the container it is entirely acceptable to include low pressure air, such as, for example, atmospheric pressure, or slightly above, in the container; and wherein the container can be boiled and withstand the increased pressure of the expanded hot gases in the container.

Finally the invention is seen to be embodied in a method of packaging a product. The first step in the method is that of coextruding a three layer coextrudable film by a tubular liquid quench process. It is significant that the film have a first layer of nylon selected from the group consisting of nylon 6,6 and combinations of nylon 6,6 with nylon 6 wherein the combinations have melting point temperatures greater than the melting point temperature of the corresponding nylon 6. A second layer comprises linear low density polyethylene. A third functionally adhesive layer is between the first and second layers. The second step is that of forming a container by sealing portions of the film to each other in face to face relationship about a common area to form a container having one side, or end, left open. The third step is that of putting a product in the package with or without the addition of air at low pressure. The fourth step is sealing the package closed. And the fifth step is boiling the sealed package.

DETAILED DESCRIPTION OF THE ILLUSTRATED EMBODIMENTS

Figure 1:
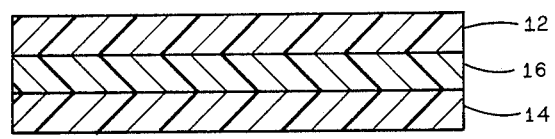
FIG. 1 is a cross-section of a film of this invention.

FIG. 1 shows a cross section of a three layer sheet material used in this invention. The composition of layer 12 is a nylon selected from the group consisting of nylon 6,6 and combinations of nylon 6,6 with nylon 6 wherein the combinations have melting point temeratures greater than the melting point temperature of the corresponding nylon 6. Layer 12 is used on the outside of the package. Layer 14 is used on the inside of the package. Its composition is linear low density polyethylene and optionally up to about 50% low density polyethylene. Layer 16 is an adhesive layer which adheres layers 12 and 14 to each other. Its composition is preferably based on linear low density polyethylene.

Figure 2:
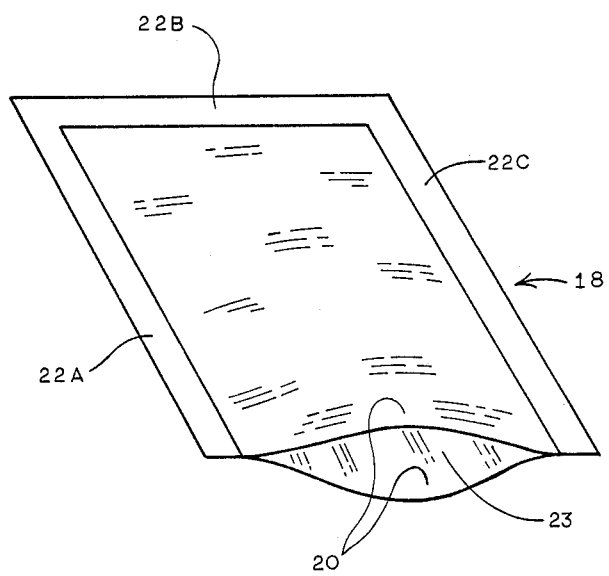
FIG. 2 is a pictorial view of an open package made from films of this invention.

FIG. 2 shows a container made of sheet material of this invention, as in FIG. 1. The container 18 is formed from either two separate portions 20 of the sheet material, or by folding a piece of the sheet material over onto itself so that the portions thereof are in face to face relationship. Heat seals are then formed as at 22A, 22B, and 22C, along portions of the periphery, leaving an open end 23 for insertion of product. The sheet material may also be used as lid stock for sealing to a pre-formed tray, or the like, having a surface which is compatible for forming a seal with the instant sheet material.

Figure 3:
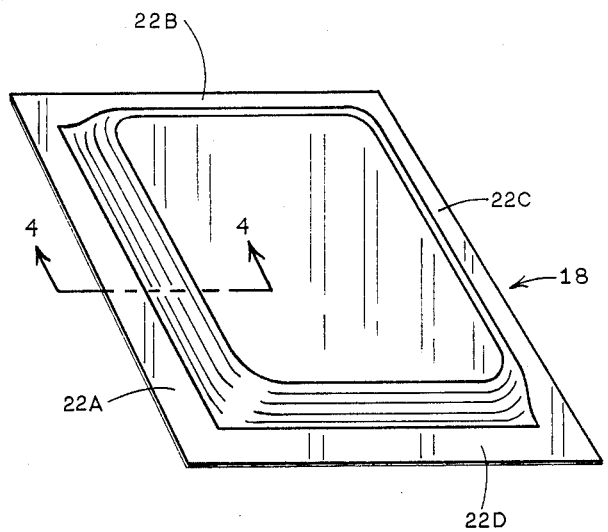
FIG. 3 is a closed and sealed package, and having product therein, the package being made with films of this invention.

FIG. 3 shows a container as in FIG. 2 with the open end 23 having been closed by the formation of the seal 22D.

Figure 4:
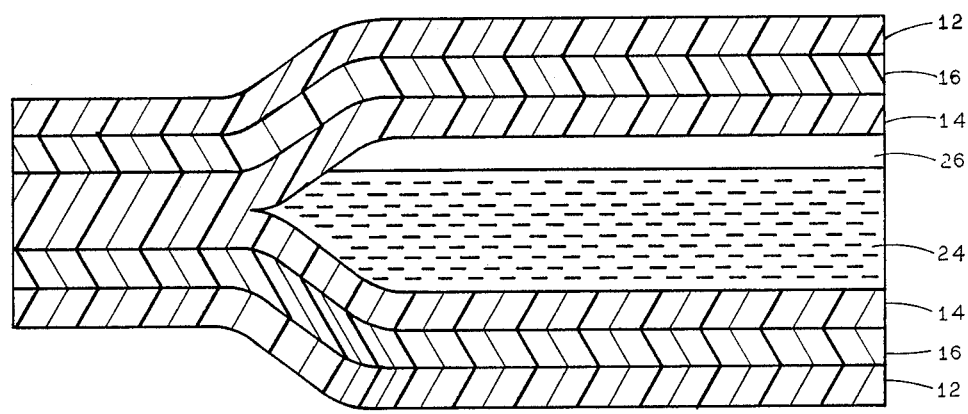
FIG. 4 is a cross-section taken at 4—4 of FIG. 3 and showing the relationship of the packaging materials, the product, and any enclosed air.

FIG. 4 shows a cross-section of the closed and sealed container of FIG. 3. Facing portions of the sheet materials on opposite sides of the container, are seen to be heat sealed together as indicated at 22A. The product 24 partially fills the package, leaving an unfilled space 26 which may be occupied by a gas such as air.

Returning now to the film itself, it is seen that each of the layers must be capable of withstanding boiling temperatures in order for the film per se to survive the processing. The composition of layer 12 is selected for its heat tolerance, and its toughness characteristics. Layer 14 is selected for its capability to form strong heat seals which will remain strong throughout the process of the package being boiled, and being subjected to expansive stresses caused by expanding gases in the package. Layer 16 must have good adhesion to both layers 12 and 14, and must have enough heat resistance to withstand the boiling temperatures and still retain a good adhesion. Further, the compositions of the several layers must be compatible with coextrusion from the die at a single temperature.

It has been found that the combination of properties required in the film is satisfied in a film where layer 12 is about 20% of the thickness of the film. While lower fractions of nylon may be acceptable, reduction to less than 15% of the thickness is not preferred because the overall strength of the package, as regards the capabilities to tolerate the stresses of the coextrusion process and the boiling temperature, is unacceptable reduced. As the amount of nylon is increased over 20%, the coextrusion process becomes more and more difficult until at about 40% the coextrusion cannot be carried out with certain equipment. So the amount of nylon may range from about 15% to about 40% of the thickness of the film.

As regards performance properties of the sealant layer 14, and especially regarding its functional campatibility with the coextrusion process and the boiling container-processing temperatures, it is preferred that the layer 14 composition be 100% linear low density polyethylene. The linear low density polyethylene is especially preferred for its flex crack resistance. In some embodiments, low density polyethylene is incorporated into the layer 14 composition, up to about 50% by weight, preferably up to about 40%.

From applicants' observations, it appears that the first layer of nylon is functional to provide the primary strength to support the coextruded tube in the preferred embodiments, where the nylon has a high fraction of nylon 6,6 and is about 20% or more of the thickness of the film. When the amount of nylon is reduced, or when the fraction of nylon 6,6 is reduced in favor of nylon 6, it is preferred to include some low density polyethylene in the second layer. The incorporation of low density polyethylene into the composition is believed to lend a degree of stability and support to the bubble. So a fraction of the composition of layer 14 may be low density polyethylene. Blend compositions over 50% LDPE are less capable of withstanding the boiling process temperatures, especially as measured in terms of stress crack resistance, and so are not used.

The adhesive material in layer 16 is preferably a carboxy modified linear low density polyethylene base material. One such material which is believed to be an anhydride modified linear low density polyethylene is sold by Mitsui Company of Japan under the tradename NF-500. Other adhesive materials may be used as long as they are compatible with the extrusion processing conditions and the package boiling conditions, and provide the needed adhesion throughout the package life cycle described herein, and including normal commercial handling.

The films of this invention which are to be used to make boilable pouches are typically of the order of 2 to 6 mils thick. Substantially thinner films lack the strength to withstand the boiling temperatures. Substantially thicker films are less flexible, and thus may be cracked by the stress caused by gaseous expansion when the container is boiled. Thicker films are also, economically speaking, more expensive and thus not competitive. Within this framework, layer 12 preferably represents about 15% to about 25% of the thickness of the film. Layer 16 is preferably about 10% and no more than about 20% of the film thickness. Layer 14 is at least 55% and no more than about 80% of the thickness of the film.

A fundamental problem addressed in the invention herein is that nylon 6, which has been used alone conventionally, tends to become brittle when it is boiled, and yet a heat resistant polymer is necessary as at least one of the layers of the package. This brittleness can be overcome by molecularly orienting the nylon 6 as described in application Ser. No. 830,412, filed Feb. 18, 1986 now U.S. Pat. No. 4,687,688. But the nylon 6 is still somewhat sensitive to the thermal stresses of the package environment. The inventors herein have now discovered that both the brittleness of the film and its sensitivity to the thermal environment may be overcome by incorporating nylon 6,6 into the composition, and by using novel combinations of processing parameters to accommodate that incorporation.

By using the preferred combination including nylon 6,6 in one outer layer and 100% LLDPE as the other outer layer, a film having excellent clarity, heat resistance, and flex crack resistance is obtained.

Heat resistance of the film is the temperature at which the film begins to distort or melt. One competitive film is an adhesive lamination of polyethylene terephthalate laminated to LLDPE. While this film has improved heat resistance of over about 200° C., the adhesive lamination process makes it expensive compared to the economical coextrusion process preferred in the instant invention. Also the PET is more expensive than nylon. Another film, disclosed in U.S. Pat. No. 4,687,688 is a coextrusion of nylon 6 with a blend of LLDPE and LDPE. As stated in that application, the purpose of the LDPE is to improve the tubular coextrusion processing by stabilizing the extruded tube. The disadvantage of the LDPE is in reduced flex crack resistance, as seen hereinafter. And while nylon 6 provides good abuse resistance, it has been found, as indicated in above application Ser. No. 830,412, that molecular orientation of the film is necessary to overcome a tendency of the nylon 6 to become brittle upon the anticipated boiling processing of the package. Even so, the heat resistance of the oriented nylon 6 structure is only about 177° C., as compared to about 288° C. for the coextruded, unoriented films herein of 100% nylon 6,6 in the first layer.

As indicated for the above U.S. Pat. No. 4,687,688, the primary function of the LDPE in that application was to provide support/stability to the extruded tube. Indeed, the presence of LDPE was tolerated as necessary, even though it reduced the excellent flex crack resistance of the LLDPE layer. And, apparently, it was the sealant layer of LLDPE and LDPE which provided the structural melt strength for that film extrudate, at a die temperature of about 215° C.

At that about 215° C. die temperature, the LLDPE used therein has a melt index of about 1.0. In order to extrude the instant coextruded film herein, when using 100% nylon 6,6 as the first layer composition, it is necessary to operate the process at a temperature above the melting point of the highest melting component, namely nylon 6,6. Thus, the die temperature used herein is typically of the order of 271° C.

Since it was necessary to include the LDPE in the LLDPE layer at about 215° C., in the U.S. Pat. No. 4,687,688 structure including nylon 6, in order to stabilize the extrudate tube, it would be expected that it would be necessary to include even more LDPE at this higher temperature of about 271° C. To the contrary, it has unexpectedly been found that the layer which is eventually used as the sealant layer in the package may be 100% LLDPE, with all its excellent flex crack resistance, when the composition of the layer on the other surface is 100% nylon 6,6; even though the extrusion processing temperature is much higher, at 271° C., than the temperature at which the nylon 6 film, which requires LDPE in the sealant layer, is coextruded. Additionally, the nylon 6,6 film need not be molecularly oriented to avoid brittleness, though it can be oriented if desired.

The resulting unoriented film containing 100% nylon 6,6 as the first layer has excellent flex crack resistance as compared to previous films, and as indicated in Table 1 below. The flex crack resistance is defined as the number of pinholes in an 8"×11" sample that is Gelbo flexed for 900 cycles at a rate of 40 cycles/minute. This is a highly abusive test which exceeds the normal level of abuse in typical packaging life cycle. The fewer the number of pinholes, the better the indicated package performance.

TABLE 1

| Film | Average Number of Pinholes |
| --- | --- |
| PET/Adhesive/LLDPE | 5.8 |
| Nylon 6/Adhesive/LLDPE | 3.8 |
| Nylon 6/Adh. Tie/LLDPE-LDPE blend (coextruded, oriented) | 6.0 |
| Nylon 6,6/Adh. Tie/LLDPE (coextruded, unoriented) (This invention) | 2.0 |

Table 1 shows that both the adhesive laminated PET film and the coextruded nylon 6 film have substantially more of the objectionable pinholes than films containing 100% nylon 6,6 as the first layer, in this abusive test. The adhesive laminated nylon 6 film is better than adhesive laminated PET, but it still has more pinholes than films using the nylon 6,6; by a factor of 1.9 to 1, and is economically encumbered by the adhesive lamination process.

Thus the films of the invention are both economically and functionally superior to other similar films.

Based on the knowledge of typical extrusion temperatures of LLDPE at 215° C. and nylon 6,6 at 271° C., it would not be expected that these materials could be coextruded in a tubular coextrusion process. It would be expected that the LLDPE might be degraded at this much higher temperature and that, in any event, it would have such a high melt flow rate that the tube could not be supported. On the contrary, no degradation is experienced, and the extruded tube is readily maintained in the extrusion process.

Thus the preferred process is a tubular rapid quench coextrusion. Rapid quenching of the extrudate is desired to preserve the amorphous nature of the molecular arrangements in the layers, which is beneficial for the subsequent boiling process. Rapid quenching is typically achieved by passing the extruded tube through a water ring. Alternatively, the tube may be subjected to cold gases, such as cryogenic gases, to cool it quickly.

Typical processing temperatures are 249° C. at the outlet of the extruders processing LLDPE for layer 14 and tie layer 16. Comparable temperature at the outlet of the extruder processing the nylon 6,6 of layer 12 is 271° C. The three layers are joined at the die and typically exit the die at a temperature of 316°–321° C.

Conventional amounts of conventional additives are used as desired.

Films of the invention may be made into packages by sealing together facing portions of two separate sheets of the material, or by folding over a portion of the sheet material and heat sealing it to itself about a contiguous periphery in order to form a container as seen in FIG. 2. After the container is formed, the package may have product inserted therein through the open end 23. The container may then be evacuated and sealed, or air may be left in the container for cushioning purposes, or for other purposes.

In an alternate construction, a package may be fabricated from a combination of a thermoformed receptacle and a film closure, where especially the film closure, and preferably both the receptacle and the film are structured in accordance with the sheet materials of this invention.

In cases where a substantial amount of air is left in the container, the boiling of the container causes the expansion, not only of any water which may be contained in the container, which water turns into steam as boiling temperatures are approached, but also the expansion of any contained air. Significant stresses are placed on the container during the boiling operation by the combination of the steam, and any air which may be left in the container. The container is susceptible to being ruptured during the boiling because of the pressure applied by this heated steam and air.

And so a functional and performance test of containers of the invention is provided by forming containers from the film, filling them partially full with water, and sealing them leaving a substantial amount of air in the package along with the water. The sealed package is then boiled for 30 minutes at standard atmospheric boiling temperatures and conditions. As the container internal temperature increases, the gaseous pressure inside the container increases as it expands, applying substantial force to the container, particularly at its seals. Containers which burst or otherwise break or leak during the boiling processing, of course, are considered failures, and unacceptable. Containers which survive the processing substantially intact are considered successful, and acceptable.

In layer 12, the preferred composition is essentially 100% nylon 6,6. Nylon 6,6 is preferred, as compared to nylon 6, because the nylon 6,6 exhibits greater toughness, and can better tolerate the high temperatures to which the film is exposed, both in the process of forming the film, and the process of packaging the product and sterilizing the filled and sealed package.

Combinations of nylon 6,6 and nylon 6 are beneficially used to the extent they tolerate higher temperatures, and are tougher than, a corresponding nylon 6 composition. Since the toughness of the film is improved by the incorporation of even small amounts of nylon 6,6 into the composition, the desirability of a given combination of nylon 6,6 and nylon 6, over a corresponding 100% nylon 6 composition, depends primarily on the melting point temperature of the given composition of nylon 6,6 and nylon 6 as compared to that of the 100% nylon 6. To the extent the melting point of the combination is greater than the melting point of the corresponding nylon 6, the composition is an improvement over plain nylon 6, and is preferred, as compared to the films disclosed in application Ser. No. 830,412.

As the amount of nylon 6 in the composition is decreased in favor of nylon 6,6, the need for the LDPE in layer 14 to support the coextrusion process is commensurately decreased, until, as the composition approaches 100% nylon 6,6, the coextrusion process is supported adequately without use of LDPE in layer 14. The extrusion processing temperature is, of course, adjusted to accommodate the melting properties of especially the nylon composition of layer 12.

Figure 5:
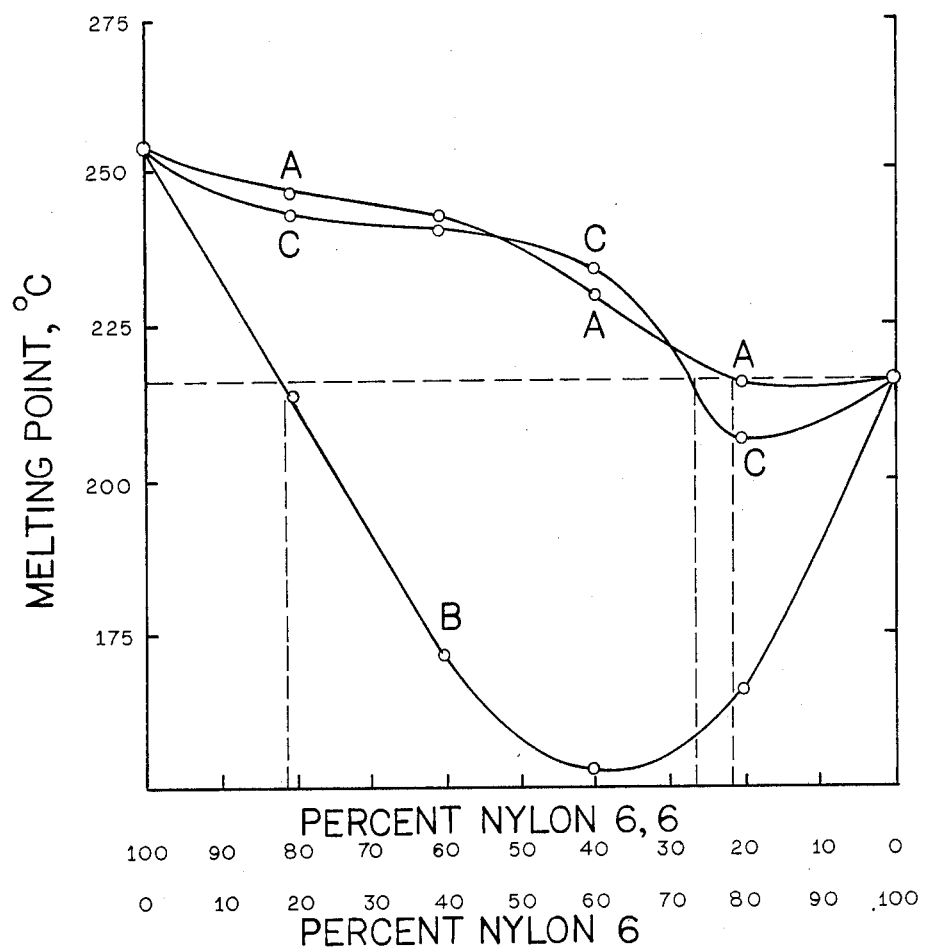
FIG. 5 shows the melting point temperatures of combinations of nylon 6,6 and nylon 6.

FIG. 5 shows, in general representation, the melting point temperatures of combinations of nylon 6,6 and nylon 6. The combinations represented are blends (Curve A), random copolymers (Curve B), and block copolymers (Curve C). As seen in FIG. 5, blends of nylon 6,6 and nylon 6 having melting points above the melting points of the corresponding nylon 6, and thus advantageous for use in the instant invention are those containing greater than about 20% nylon 6,6. Random copolymers having melting points above the melting point of the corresponding nylon 6 are those having greater than about 80% nylon 6,6. Finally, block copolymers having melting points above the melting point temperature of the corresponding nylon 6 are those having greater than about 26% nylon 6,6.

Thus the criteria for determining whether a composition containing nylon 6,6 and nylon 6 is suitable for use in this invention rests heavily on the melting point of the composition; and usually the melting point criteria is the determining factor governing whether a given film is satisfactory for use herein by having heat tolerance greater than the heat tolerance of nylon 6 alone. To that end, acceptable combinations of nylon 6,6 and nylon 6, as represented in FIG. 5, are blends > about 20% nylon 6,6
random copolymers > about 80% nylon 6,6
block copolymers > about 26% nylon 6,6

The threshold ratio does vary somewhat, depending on the properties of the specific nylon 6,6 and the specific nylon 6 selected. This acknowledges that both nylon 6,6 and nylon 6 represent families of polymers having a range of physical properites, including melting point temperatures. Combinations of the blends, the block copolymers and the random copolymers can be used so long as their heat tolerance is greater than that of the corresponding nylon 6.

THE EXAMPLES

Three layer films were made by the tubular water quench process. The first layer was Dupont Zytel 42 nylon 6,6 on the outer surface of the tube. The second layer on the inner surface of the tube was Dow 2056 LLDPE. The third, and intervening, adhesive layer was Mitsui's Admer NF-500, an LLDPE-based adhesive polymer. The first layer of nylon 6,6 was 20% of the thickness of the film. The third layer of NF-500 was 10% of the thickness of the film. The second layer of LLDPE was 70% of the thickness of the film. Total film thickness of the example films ranged from 2.0 mils to 5.5 mils.

All the films ran well in the tubular extrusion process. Extrusion die temperature at the die outlet was about 271° C. The coextruded film was water quenched at a temperature of 43° C. and was wound up. Portions of the film were formed into packages as seen in FIG. 2. The formed packages were 6 inches wide and 6 inches high and were filled with 0.25 liter of water and closed leaving a substantial amount of air in the package. The closed and sealed packages were boiled in water at atmospheric pressure for 30 minutes and the packages observed. Packages made according to the above described examples all survived the boiling process without failure, and remained substantially intact.

Thus it is seen that the invention provides novel and economical films, of the order of 2 to 6 mils thickness, which have the capability of withstanding a boiling process while experiencing internal pressure exerted by steam and expanding hot air.

The invention further provides a method of packaging a product in a sealed container with an included quantity of air in the container, wherein the subsequent boiling of the container does not cause rupture of the container; and wherein the thickness of the container walls is of the order of 2 to 6 mils.

Having thus described the invention, what is claimed is:

1. A multiple layer film, comprising:
   (a) a first layer, the composition of said first layer being selected from the group consisting of nylon 6,6 and combinations of nylon 6,6 with nylon 6 wherein said combinations have melting point temperatures greater than the melting point temperature of the corresponding nylon 6;
   (b) a second layer, the composition of said second layer comprising linear low density polyethylene, and 0% to 50% by weight low density polyethylene in blend composition; and
   (c) a third layer of an adhesive polymer, said third layer being disposed between said first and second layers and adhering said first and second layers to each other.

2. A multiple layer film as in claim 1 wherein said film is 2.0 to 6.0 mils thick and wherein said first layer is at least 15% of the thickness of said film.

3. A multiple layer coextruded film, comprising:
   (a) a first layer, the composition of said first layer being selected from the group consisting of nylon 6,6 and combinations of nylon 6,6 with nylon 6 wherein said combinations have melting point temperatures greater than the melting point temperature of the corresponding nylon 6;

(b) a second layer, the composition of said second layer consisting essentially of linear low density polyethylene, and 0% to 40% by weight low density polyethylene; and (c) a third layer of an adhesive polymer, said third layer being between said first and second layers and adhering said first and second layers to each other, said multiple layer film having been susceptible to tubular coextrusion of said first, second, and third layers.

4. A coextruded multiple layer film as in claim 3 wherein said film is 2.0 to 6.0 mils thick and wherein said first layer is at least 15% of the thickness of said film.

5. A packaging container made with a film of claim 1.

6. A packaging container made with a film of claim 2.

7. A packaging container made with a coextruded film of claim 3.

8. A packaging container made with a coextruded film of claim 4.

9. A packaging container made from a film of claim 1, portions of said film being sealed to each other in face-to-face relationship to thereby form an enclosure.

10. A packaging container made from a film of claim 2, portions of said film being sealed to each other in face-to-face relationship to thereby form an enclosure.

11. A packaging container made from a coextruded film of claim 3, portions of said film being sealed to each other in face-to-face relationship to thereby form an enclosure.

12. A packaging container made from a coextruded film of claim 4, portions of said film being sealed to each other in face-to-face relationship to thereby form an enclosure.

13. A packaging container as in claim 9 and wherein said container can be filled with air, and optionally other contents, and sealed, and subsequently boiled in water for at least about 10 minutes without rupture.

14. A packaging container as in claim 10 and wherein said container can be filled with air, and optionally other contents, and sealed, and subsequently boiled in water for at least about 10 minutes without rupture.

15. A packaging container as in claim 11 and wherein said container can be filled with air, and optionally other contents, and sealed, and subsequently boiled in water for at least about 10 minutes without rupture.

16. A packaging container as in claim 12 and wherein said container can be filled with air, and optionally other contents, and sealed, and subsequently boiled in water for at least about 10 minutes without rupture.

17. A method of making a film comprising coextruding, from a tubular die, a coextrudable multiple layer film having a first layer, the composition of said first layer being selected from the group consisting of nylon 6,6 and combinations of nylon 6,6 with nylon 6 wherein said combinations have melting point temperatures greater than the melting point temperature of the corresponding nylon 6; a second layer, the composition of the second layer comprising linear low density polyethylene, and 0% to 50% by weight low density polyethylene; and a third layer of an adhesive polymer, said third layer being disposed between said first and second layers and adhering said first and second layers to each other.

18. A method as in claim 17 and including quenching said coextruded film in a rapid quenching medium.

19. A method as in claim 17 wherein said film is 2.0 to 6.0 mils thick and wherein said first layer is at least 15% of the thickness of said film.

20. A method of packaging a product, said method comprising the steps of:

(a) coextruding a three layer coextrudable film by tubular rapid quench process, said film comprising (i) a first layer, the composition of said first layer being selected from the group consisting of nylon 6,6 and combinations of nylon 6,6 with nylon 6 wherein said combinations have melting point temperatures greater than the melting point temperature of the corresponding nylon 6, (ii) a second layer comprising linear low density polyethylene, and 0% to 40% by weight low density polyethylene, and (iii) a third intervening adhesive layer;

(b) sealing portions of said film to each other in face-to-face relationship to form a package;

(c) putting a product in said package with a low pressure gas;

(d) sealing said package closed; and (e) boiling said package in water.

21. A method as in claim 20, said package having a low gaseous pressure therein, approximating atmospheric pressure, before boiling of said package.

22. A method as in claim 20 wherein said film is 2.0 to 6.0 mils thick and wherein said first layer is at least 15% of the thickness of said film.

23. A method as in claim 21 wherein said film is 2.0 to 6.0 mils thick and wherein said first layer is at least 15% of the thickness of said film.

* * * * *